United States Patent [19]

Thiel et al.

[11] Patent Number: 5,096,023
[45] Date of Patent: Mar. 17, 1992

[54] SPOT TYPE DISC BRAKE IN PARTICULAR INTERNALLY STRADDLING DISC BRAKE

[75] Inventors: Rudolf Thiel, Frankfurt am Main; Franz Wienecke, Oberursel; Helmut Kast, Frankfurt am Main; Hans Bungert, Geisenheim, all of Fed. Rep. of Germany

[73] Assignee: Alfred Teves GmbH, Frankfurt am Main, Fed. Rep. of Germany

[21] Appl. No.: 649,156
[22] PCT Filed: Jan. 19, 1989
[86] PCT No.: PCT/EP89/00060
§ 371 Date: Nov. 1, 1989
§ 102(e) Date: Nov. 1, 1989
[87] PCT Pub. No.: WO89/08794
PCT Pub. Date: Sep. 21, 1989

Related U.S. Application Data

[63] Continuation of Ser. No. 442,359, Nov. 1, 1989, abandoned.

[30] Foreign Application Priority Data
Mar. 11, 1988 [DE] Fed. Rep. of Germany ....... 3808139

[51] Int. Cl.$^5$ ............................................. F16D 55/227
[52] U.S. Cl. .................................. 188/73.36; 188/73.1; 188/73.38; 188/250 B; 192/30 V

[58] Field of Search ................ 188/73.78, 73.36, 73.37, 188/73.32, 73.31, 73.1, 250 B; 192/30 V

[56] References Cited

U.S. PATENT DOCUMENTS

| 4,082,166 | 4/1978 | Ritsema ............................ 188/73.32 |
| 4,121,699 | 10/1978 | Tsuruta et al. ................ 188/73.1 X |
| 4,136,761 | 1/1979 | Burgdorf et al. ............ 188/73.36 X |
| 4,296,841 | 10/1981 | Fujimori et al. ................. 188/73.38 |
| 4,305,484 | 12/1981 | Bradley ............................ 188/73.32 |
| 4,394,891 | 7/1983 | Oshima ............................ 188/73.38 |
| 4,805,745 | 2/1989 | Thiel ................................ 188/73.31 |

FOREIGN PATENT DOCUMENTS

| 3419541 | 11/1985 | Fed. Rep. of Germany ..... 188/73.1 |
| 3446755 | 7/1986 | Fed. Rep. of Germany ... 188/73.38 |
| 167538 | 10/1982 | Japan .............................. 188/73.38 |
| 1110896 | 4/1968 | United Kingdom ............ 188/250 B |

Primary Examiner—George E. A. Halvosa
Attorney, Agent, or Firm—Robert P. Seitter; J. Gordon Lewis

[57] ABSTRACT

A spot-type disc brake, in particular to a disc brake straddling the brake disc internally in which a brake and essential assemblies required for that brake and a process for mounting of such a brake are provided. Particular mounting arrangements allow each of the brake shoes to be removed in a radial direction without having to disassemble the housing or parts of the housing.

7 Claims, 3 Drawing Sheets

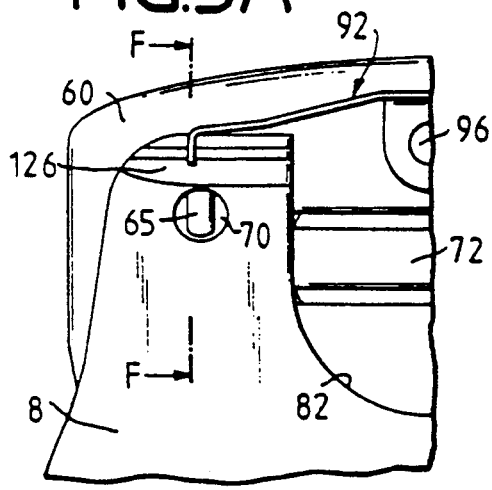
FIG.5A
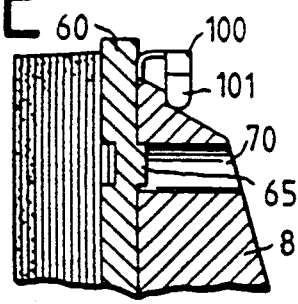
FIG.5E
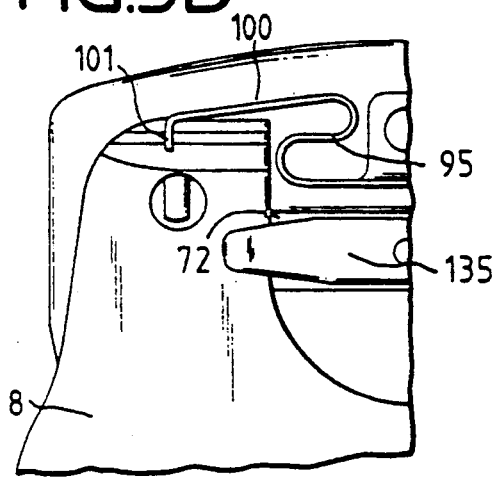
FIG.5B
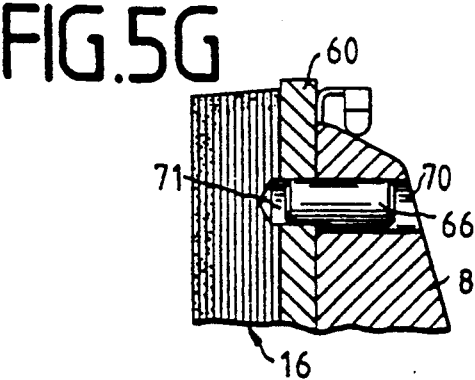
FIG.5F
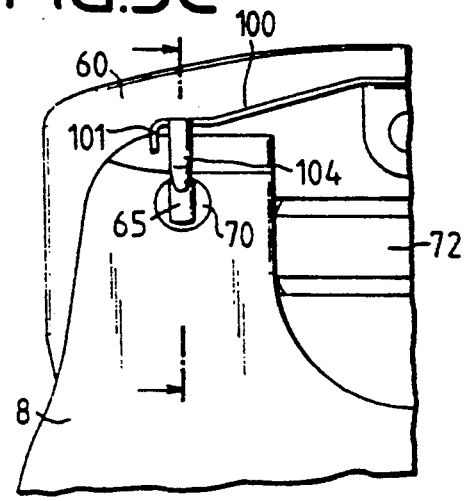
FIG.5C
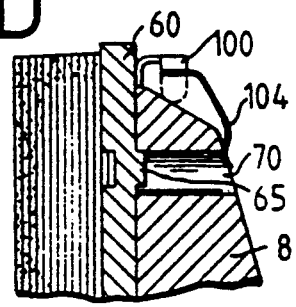
FIG.5G
FIG.5D

SPOT TYPE DISC BRAKE IN PARTICULAR INTERNALLY STRADDLING DISC BRAKE

This application is a continuation of application Ser. No. 442,359, filed Nov. 1, 1989, now abandoned.

BACKGROUND OF THE INVENTION

This inventions relates to a spot-type disc brake which straddles the brake disc and in which the brake shoes are mounted so that they may be removed from the disc brake housing in the radial direction without having to disassemble the housing.

A number of different designs are known for spot-type disc brakes whose structure is determined by certain requirements. These requirements include, for example, that the brake shoes must be easily removable, the detachment of retaining pins, the swiveling-off or unmounting of brake housings etc., for instance, should be avoided. According to one proposed solution, it is suggested to dispose the brake shoes in such a manner as to be removable not in the direction of the housing cover but in the opposite direction so that the housing cover does not block the assembly and disassembly path of the brake shoes.

It is known from published German patent application No. 34 25 670 (corresponding to U.S. Pat. No. 4,643,277, issued Feb. 17, 1987) to provide a spring for a brake shoe which retains the latter in elastic engagement with its guide being arranged in axial direction relative to the brake disc. Although the brake shoe disclosed in this publication offers the advantage of being very flat due to springs arranged at the backplate being renounced to (see also the German patent application No. 35 32 373) it has the disadvantage that the spring is solidly connected to the shoe and, thus, must be replaced together with the brake shoe in the event of the latter's renewal. Moreover, the known spring arrangement is not suitable for disc brakes in which the brake shoes are to be assembled and disassembled from the side of the carrier rather than from the side of the housing cover.

The present invention is, therefore, related to a spot-type disc brake and has as an object rendering it possible to remove the brake shoes toward the side of the carrier. Beyond this, the disc brake of the kind under review is to do with a particularly scarce assembly and disassembly space.

SUMMARY OF THE INVENTION

The object of the invention is achieved by a spring acting on the brake shoe, with its ends engaged with the carrier. In this manner, the wire spring urges the brake shoe onto its guide in a direction resisting removal. Beyond this, a spring at the lining backplate as described in the German patent application No. 35 32 373 may also be foregone according to the teachings of the present invention. It is true that the known spring offers the advantage of being neutral as regards the direction of mounting of the brake shoe but simultaneously it has the disadvantage of causing an increase in the overall height of the brake shoe, and thus the required assembly space is increased.

Although the disc brake according to the present invention is suited, in particular, as an internally straddling disc brake in which only a restricted mounting space for the brake shoes is available it also can be used as an externally straddling brake in which case the bent wire spring assumes at the same time the function of securing the brake shoes and preventing them from falling out of their seating. The locking-type securing function is, of course, assumed by the spring just as well if and when the inventive disc brake is used as an internally straddling disc brake.

An extension of the spring travel stroke and, as a result, a facilitation of the serviceability of the wire spring is obtained in accordance with a further embodiment.

The combination of characteristics of a further embodiment in the shape of a further evolution of the teachings of the invention allows to give the spring of the disc brake a good guidance. According to that embodiment, the first end of the spring is swivelably secured in the carrier, whereas the second end allows to be arrested at the opposite side of the carrier.

According to a further embodiment of the invention, the two carrier arms are connected by a connecting web so that the second spring end lockingly engages the connecting web. In a further improvement of the invention, the guide opening for the first end of the wire spring is in the shape of a through bore in the connecting web.

In order to retain the first end of the wire spring within the through bore, the external stem of the U-shaped spring end may either be selected of a sufficient length so as to be fixedly retained within the through bore with its first end during removal of the brake shoes. Or else, the spring end is of a sufficiently short length so as to be able to be removed and be put aside for a while by the servicing personnel in the event of unmounting of the brake shoes. Anyway, it is essential that according to a further embodiment the spring, in its arrested condition, is secured against unintentional loosening by the action of the external stem.

A further embodiment is recommended in order to increase the level travel for the section of the spring to be arrested manually and, as a consequence, to facilitate handling of the spring. This embodiment enables particularly an evolution of the inventive thought according to which the piston-side brake lining not only may be urged against its guide but, in addition, urged in the direction of the piston at the same time. In this way, the wire spring not only supports the brake shoe elastically in a radial direction against its guide but additionally also in an axial direction against the brake piston.

In various instances it is desirable to increase the lever travel for the swiveling motion of the brake shoe in axial direction toward the piston and simultaneously to minimize the thermal influences of the brake lining becoming hot during brake operation.

A further embodiment allows a particularly long travel for the first arresting section of the wire spring. In addition to this, both the brake shoes and the spring as well as the carrier become independent, as to their configuration, of whether the disc brake is mounted on the right or on the left side of the automobile.

In order to additionally prevent the brake shoes from being lost besides the retaining effect of the spring, a short projection protruding from the backplate into the brake cylinder prevents the shoe from being lost in a radial direction. The projection becomes especially effective in that it is constantly maintained in engagement with the cylinder by means of the spring.

The invention is to be particularly suited for disc brakes in which only a restricted mounting space is available for the brake shoes. A further embodiment prevents the projection from catching at the dust cover of the brake cylinder damaging the latter when the piston-side first brake shoe is being mounted.

A combination of characteristics renders the inventive disc brake suited, in particular, as an internally straddling disc brake. That is to say, if its mounting space is restricted, then the external brake shoe facing away from the piston is no longer accessible for reasons of design. This means that provisions must be taken in that case that the space required to mount the external brake shoe is minimized and that this brake shoe allows simultaneously to be maintained well anchored also when the brake disc is being mounted or unmounted. In particular, these characteristics prevent the external brake shoe from being dislodged out of its seating and, as a consequence, from being impaired in its braking effect on its mounting du to the subsequent mounting of the brake disc.

Other embodiments which represent an advantageous evolution of the inventive concept describe appropriate embodiments of the piston-side first brake shoe, of the external second brake shoe, of the wire spring and advantageous procedures for the mounting and unmounting of the brake shoes.

BRIEF DESCRIPTION OF THE DRAWING

Embodiments of the invention will be described in the following and are illustrated in the accompanying drawing, in which:

FIGS. 5A to 5C are fragmentary side views of further embodiments of the inventive disc brake; and, FIGS. 5D to 5G are fragmentary part-sectional representations describing alternate embodiments of the fixation of the external brake shoe.

DETAILED DESCRIPTION

Figure 1:
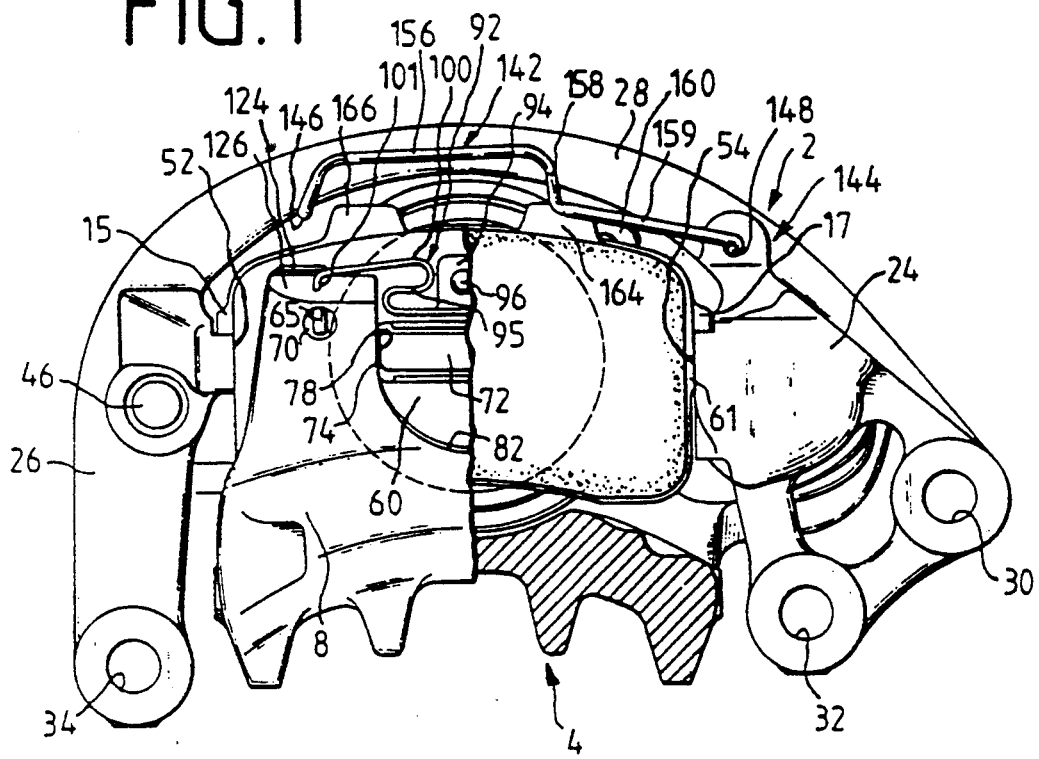
FIG. 1 is a side view partially broken away of an internally straddling spot-type disc brake as viewed from the outside of the vehicle.

Reference is now made to the embodiment of an internally straddling disc brake 2 illustrated in FIGS. 1 to 4. The internally straddling disc brake 2 is furnished with a brake housing 4 having a substantially U-shaped configuration in longitudinal section, brake housing 4 comprising radially externally extending stems 6, 8 which are interconnected through a bridge section 10. On either side of the brake disc 12 shown in a dotted line in the drawing, brake linings 14, 16 are arranged which are straddled by the U-shaped brake housing 4. For the actuation of the disc brake, the internal stem 6 is furnished with an actuating device for the purpose of which a cylinder bore 18 is provided accommodating a piston 20 in an axially slidable manner. The piston 20 directly acts on the internal brake lining 14 as a reaction of which the brake housing 4 is slid in opposite inward direction whereby the external brake lining 16 is actuated. For that purpose, the brake housing 4 is axially slidably secured to a stationary brake carrier 22. The brake carrier 22 is formed with two brake carrier arms 24, 26 which are interconnected through a connecting web 28 so that the brake carrier 22 has an arched shape. Brake carrier 22 is connected to a steering knuckle (not shown) of a vehicle and presents three fixation points for the purpose. The fixation points are configurated as bores 30, 32, 34. In this context, two bores 30, 32 are provided at the brake carrier arm 22 arranged on the arriving side as viewed in the primary sense of rotation and the other bore at the brake carrier 26. The internal bore 32 is disposed substantially on the same radius as the bore 34 at the brake carrier arm 26 arranged on the exiting side. Bores corresponding to the bores 30, 32, 34 at the brake carrier 22 are provided in the steering knuckle so that the brake carrier 22 accommodates fastening to the steering knuckle by means of pins.

A bearing pin 36 which is rigidly accommodated in a bore of the brake housing 4 is provided for the purpose of axially slidably supporting the brake housing 4 on the brake carrier 22. The bearing pin 36 forms a free end projecting from the bore which represents a guide surface interacting with a guide bore provided in the brake carrier. A dust cover 42 is provided between the eye 38 of the brake carrier 22 containing the bore and the eye 40 of the brake housing 2 containing the fixation bore for the bearing pin for the protection of the guide surface.

A device 44 is provided on the exiting side as viewed in the drawing in order to absorb the moments occurring during braking action around the bearing pin 36. Device 44 is comprised of a short pin 46 fastened in the brake carrier arm 26 and extending parallel to the bearing pin 36 away from the brake disc. Pin 36 engages a bore 48 provided in the brake housing 4. In this configuration, the diameters of the bore 48 and of the pin 46 are selected such as to leave a free annular chamber therebetween. The annular chamber houses an elastic bushing 47 which functions to damp the movements of the pin 46 within the bore 48 occurring during braking.

In order to support the internal brake lining 14 in the brake carrier 22, the latter forms a guide 50 defined in circumferential direction by supporting surfaces 52, 54. In this context, supporting surfaces 52, 54 are provided in the range of the bearing pin 36 and of the pin 46. For the purpose of retaining the internal brake lining 14 in a first radial direction, the backing plate 61 of the internal brake lining 14 is formed with shoulders or steps 15, 17 which rest on corresponding supporting surfaces 53, 55 of the brake carrier 22.

A bent wire spring 142 projects with its first end 144 through a through bore 148. The first end 144 of the wire spring 142 is bent U-shape, the internal stem 154 being connected to the external stem 152 by a central stem extending along the longitudinal axis 151 of the through bore 148. In the embodiment illustrated in FIG. 3, the external stem 152 extending to the right as viewed in the drawing is of a relatively short length so that although securing the first end 144 from pulling out in the mounted condition of the spring 142, the spring 142 nevertheless can be removed from the opening 148 by turning it in an appropriate manner after the spring 142 has been disengaged at its second end 146.

Figure 3:
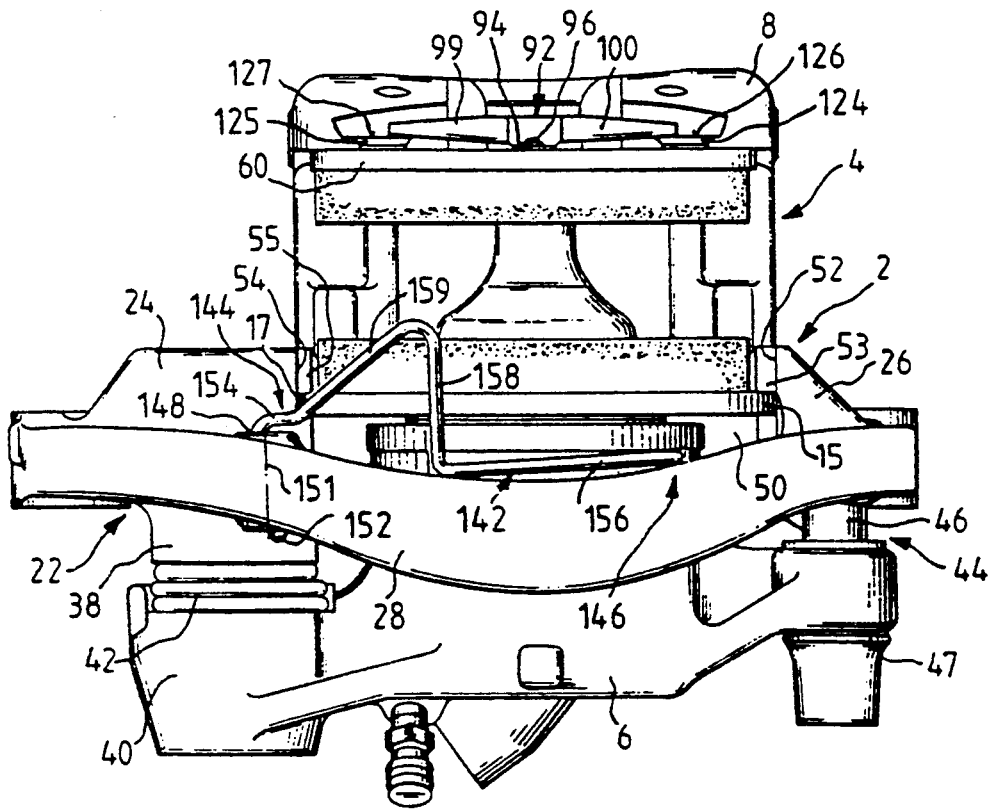
FIG. 3 shows a top view of the disc brake illustrated in FIGS. 1 and 2.

The first spring end 144 is succeeded by a third spring section 159 which extends somewhat upwardly and obliquely relative to the axis of symmetry as is shown in FIGS. 1 and 3. The third section is then followed by a second section 158 extending slightly upwardly in the direction of the brake piston 20. The end of the second section with the second end 146 of the wire spring 142 is connected by a first spring section 156 which runs substantially in circumferential direction of the brake disc 12. The second end 146 of the wire spring 142 has a claw-shaped configuration, the claw making catch beneath the connecting web 28.

The wire spring 142 has the second section 158 thereof engaging a trapezoidal projection 164 at the backplate 61 of the brake shoe 14. Since the inclination of the central section 158 slightly rises in the direction of the piston, a force directed toward the piston, is exerted on the projection 164 of the brake lining 14, and the brake lining thus need not be secured in any other manner in that direction.

When the wire spring 142 is detached, its second end 146 is simultaneously bent against the initial tension downward in the direction of the brake piston and backward in the direction of the external brake lining. As a result of this manipulation, the claw becomes free from under the connecting web 28, and the wire spring 142 can be swung about the longitudinal axis 151. As described above, the spring 142 is removable from the opening 148 due to the short-length external stem 152. However, the spring 142 can be permanently retained in the opening 148 by an adequate extension of the length of the external stem 152.

To utilize the same piston-side brake shoes both for disc brakes arranged on the right and on the left side of the automotive vehicle, it can be provided that only one projection in the axis of symmetry of the brake shoe 14 at which the central section 158 engages is formed on the backplate 61. However, two off center projections 164, 166 are envisaged in this embodiment so that the brake lining can be mounted on either side of the automotive vehicle. Indeed, this two projection design offers the additional advantage that owing to the offset, the first section 156 becomes considerably longer than the third section 159, as a result of which the spring can be bent at its end 146 and, therefore, be seated and unseated with ease due to the extended level travel.

Further, the projections 164, 166 have the advantage that the point of action of the spring 142 is shifted farther away from the rotating brake disc and that, in addition, the thermal effect of the backplate 61 becoming hot during braking action is reduced.

Figure 4:
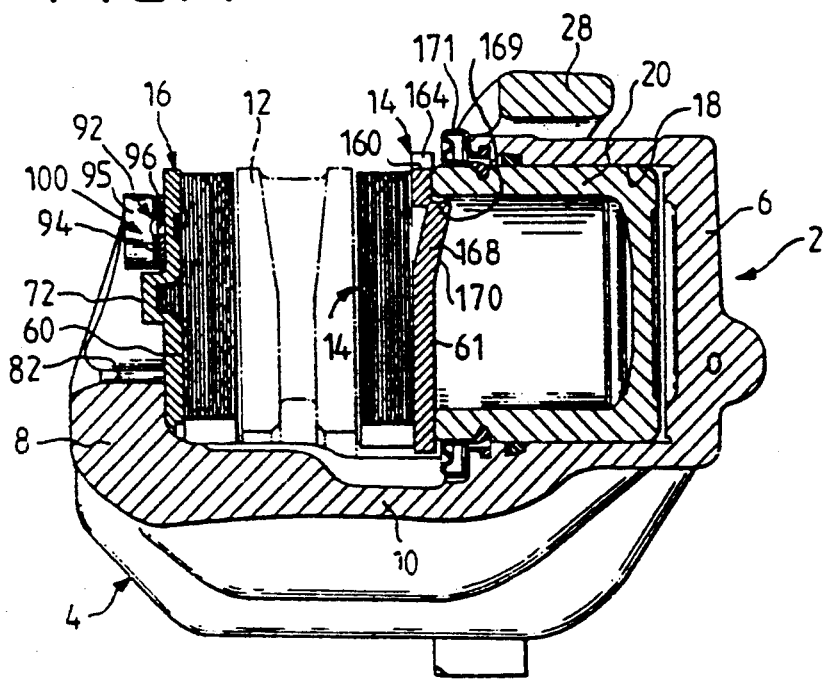
FIG. 4 is a longitudinal section view through the disc brake of FIGS. 1-3.
Figure 2:
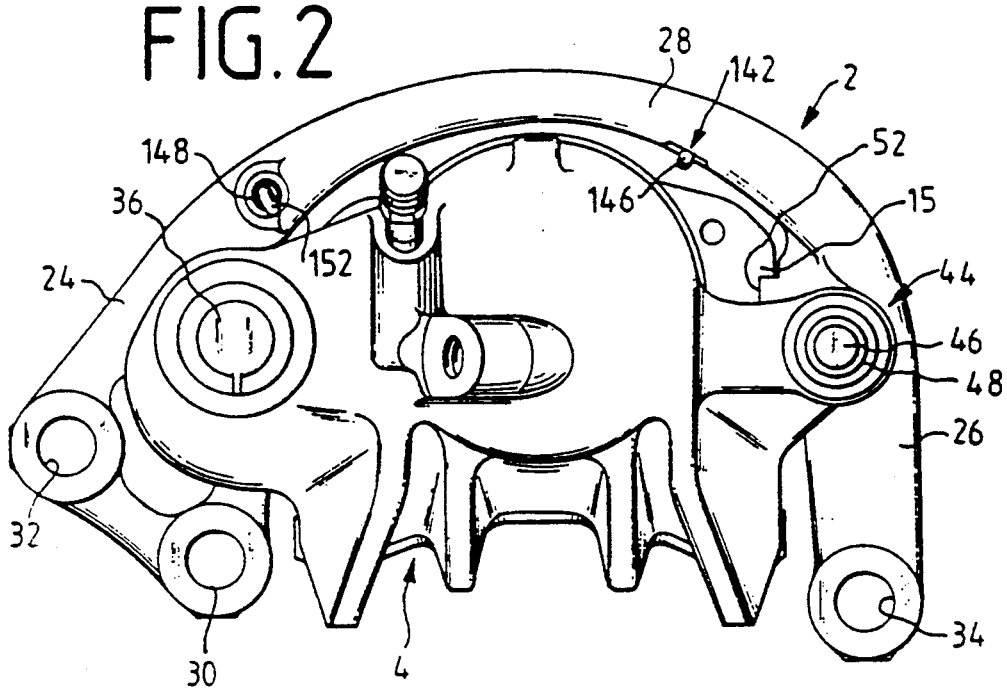
FIG. 2 is a side view of the disc brake according to FIG. 1 from the reverse side.

In FIG. 4, a nose-shaped projection 168 is illustrated at the backplate 61 of the brake lining 14 which preferably is fabricated by stamping. By means of its edge 169 extending vertically along the generated surface of the brake piston 20, this projection prevents the brake shoe 14 from moving in upward radial direction as viewing FIG. 4, out of the brake guide 50, since the edge 169 becomes hooked fast to the wall of the piston 20.

The ramp surface 170 disposed opposite the edge 169 prevents the customary dust cover 171 from being damaged when sliding in the brake shoe 14. Indeed, this could happen if instead of the ramp surface 170, a steep edge 169 is selected considering the restricted mounting space available. In that case, the sharp edge 169 would have to catch at the point 170 at the dust cover 171 damaging the latter during sliding-in of the brake shoe.

For its retaining requirement, the external brake lining 16 is furnished, at its backplate 60, with two stud-shaped projections of which only the projection 65 is illustrated in FIG. 1. The two studs 65 are fabricated by a stamping operation out of the backplate and are arranged symmetrically relative to the center line of the backplate 60. The shape of the projections 65 is substantially rectangular and elongated longitudinally in radial direction, the ends disposed in radial direction being tapered and the edges being provided with enteringside slants. For the accommodation of the projections 65, the stem 8 is provided with circular cylinder-shaped through bores 70, the side walls of the studs 65 pointing in radial direction adhering to the corresponding portions of the inside wall of the through bores 70. The studs 65 are furnished with a play within the through bores 70 in the circumferential direction of the brake disc 12. An axially salient projection 72 is fabricated by forming of the backplate in this instance is, in addition, arranged on the backplate 60 of the brake lining 16. Projection 72 presents a substantially rectangular shape and extends at the height of the supporting surfaces 52, 54 in circumferential direction. It is provided with lateral abutment surfaces 74 (only one of which is visible in FIG. 1) which interact with lateral peripheral surfaces 78 of a U-shaped recess 82 provided in the external stem 8. In this configuration, the lateral peripheral surfaces 78 of the U-shaped recess 82 are radially inwardly extended, i.e., in the direction of the bridge section 10 of the housing, to such an extent that an abutment of the projection 72 with the abutment surfaces 74 also takes place beneath the center line (for example, 4 to 6 mm), so that, on one hand, the surface pressure allows absorption and, on the other hand, supporting takes place at the point of action of the circumferential force, as a result of which any torque acting on the plate is avoided. In this way, the torque bearing on the lining of the brake shoe by the brake disc during braking action is transmitted through the lateral abutment surfaces 74 of the projection 72 to the lateral peripheral surfaces of the U-shaped recess 82 and, thus, absorbed by the stem 8.

Furthermore, a leaf-type spring 92 is fastened to the backplate 60. The leaf-type spring 92 has a substantially radially extending attachment tab 94. The attachment tab 94 is substantially rectangular in shape and is formed with a bore through which a rivet is inserted. Alternatively, attachment may also be carried out by means of two rivets, pins or similar means. At is lower end as viewed in FIG. 1, attachment tab 94 extends to two connecting sections (of which only the connecting section 95 is shown in the drawing) arranged symmetrically relative to the center line. Each connection section 95 is in a folded S-shape and extends radially. The S-shaped connecting sections, impart a greater rigidity to the leaf-type spring as well as an improved spring behavior. Each one of the two S-shaped connecting sections 95 passes over to a respective wing 99, 100 presenting a chamfered width outwardly as illustrated in FIG. 3. The outer end of each wing 99, 100 is spaced a distance of roughly 5 mm from the outer surface of the backplate 60.

As illustrated in FIG. 1, the outer ends of the wings 99, 100 have terminal portions 101, only one of which is illustrated in FIG. 1, while on the cut-away right hand half of the Figure, the front brake lining 12 is noted. Each of the two terminal portions acts with an axially directed initial tension on a respective radial abutment surface 126, 127, and in this way urges the rear surface of the backplate 60 facing away from the lining against the stem 8.

The brake shoe 16 is thus secured relative to the stem 8 in the following way: a lateral movement of the brake lining 16 relative to the stem 8 is prevented by the lateral surface 74 of the projection 72 at the peripheral surfaces 78, 80 of the U-shaped recess 82. Radially, the movement of the brake shoe 16 is limited by the studs 65 which engage the through bores 70. The brake shoe 16 is retained axially by the spring force of the terminal portions 101 which act on the abutment surface 126, 127.

Now, in order to assume the position so defined, the brake shoe 16 is inserted with its projection 72 into the recess 82, the terminal portions 101 abutting on the leaving-side slopes 124, 125 which risingly pass over to the abutment surfaces 126, 127. By pressing down the brake lining guided with the projection 72 in the stem 8, the terminal portions 101 become abutted against the associated abutment surfaces 126, 127, whereas the studs 65 become seated in the associated through bores 70.

FIGS. 5A to 5G illustrate modifications of the means for axially retaining the lining backplate 60 of the external brake shoe 16. The fixation of the backplate 60 to the stem 8 illustrated in an abridged and upscaled manner in FIG. 5A differs from what is shown in FIG. 1 by a leaf-type spring 92A of simplified configuration in which the S-shaped connecting section 95 is deleted. FIG. 5E shows in partial representation a sectional lateral view of FIG. 5A, the section taken along the line of the arrows E. The essential difference between FIG. 5B and FIG. 1 is in the addition of a retaining spring 135 riveted to the projection 72 which, moreover, axially biases the brake shoe relative to the stem 8.

In FIG. 5C, the final portion 101 of the leaf-type spring wing 100 is provided with a fishplate 104 which projects with its end into the opening 70 in the stem 8 and thus retains the backplate 60 relative to the stem 8 mainly in axial direction. FIG. 5D shows a part-lateral view of FIG. 5C in sectional representation. As is noted from FIG. 5D, radially extending abutment surfaces 126, 127 may be eliminated by using the retaining fishplate 104.

FIGS. 5F and 5G illustrate embodiments which avoid the abutment surface 126 in FIG. 5A by optionally utilizing a stud 66 instead of a projection 65. The stud may alternatively either be press fitted into the bore 70 of stem 8 or press fitted in an opening 71 of the backing plate 60 of the brake shoe 16.

The present invention is particularly suited for internally straddling disc brakes with a restricted mounting space. In this context, the mode of securing the external brake shoe 16 is selected such that it cannot be unseated when mounting the internally straddled brake disc 12. This is of particular importance because upon mounting of the internally straddled brake disc 12, the external brake shoe 16 no longer is accessible and cannot be inspected to determine if it has been moved out of its mounting position during mounting of the brake disc 12. Subsequent mounting of the internal piston-side brake shoe 14 is carried out after mounting of the brake disc 12 by radially advancing the brake shoe 14 into its mounted position along the brake disc, subsequently securing it in position by seating the bent spring 142 and locking the projection 16B in the cylinder piston 20. This securement is achieved by virtue of the axially directed force of the wire spring 142 and the restraining effect of the projection 168.

We claim:

1. A floating caliper, spot type disc brake which is internally straddling, including a generally U-shaped caliper housing having a pair of connected opposite stems, an actuator piston mounted within a bore in one of said caliper housing stems and having a projecting end facing the other of said stems, a generally U-shaped brake carrier having a pair of connected arms extending oppositely and between said caliper housing stems, means for supporting said caliper housing on said brake carrier for sliding axial movement, an internal brake shoe located between said stems and having a backing plate positioned over said projecting end of said piston, interengaging guide means on said internal shoe backing plate and said arms constraining movement of said internal shoe in a radial direction, said guide means including radially extending mating guide surfaces;
   an axial projection on said internal shoe backing plate extending within said piston end to limit radial movement and retain said internal brake shoe;
   an elongated first spring connected at either end to a respective brake carrier arm and extending across said internal shoe backing plate, said spring configured to engage said internal shoe backing plate and exert an axial spring force on said internal shoe urging said backing plate so as to retain said projection within said piston end;
   an external brake shoe having a backing plate;
   interengaging guide means on said external brake shoe backing plate and said other stem of said caliper housing constraining movement of said external brake shoe in a radial direction, said guide means for said external brake shoe including radially extending mating guide surfaces, one or more axial projections extending between said other stem and said external shoe backing plate interengaging said external shoe backing plate and other stem to limit radial movement and retain said external brake shoe; and,
   a second elongated spring attached to said external brake shoe backing plate and having portions extending across said other stem, said second spring configured to engage said external brake shoe backing plate with said portions so as to apply an axial force, thereby retaining said interengagement by said one or more projections.

2. The disc brake according to claim 1 wherein said first spring is detachably connected at either end to said carrier arms.

3. The disc brake according to claim 1 wherein said first spring comprises a wire form including end segments seated in respective openings in said carrier arm and an axially and radially sloping intermediate wire segment engaging said internal shop backing plate to apply said axial spring force thereto.

4. The disc brake according to claim 3 wherein said internal brake shoe backing plate is formed with a radially projecting tab aligned with said intermediate segment of said first spring.

5. The disc brake according to claim 4 wherein said intermediate segment is located off center whereby said end segments are of unequal length.

6. The disc brake according to claim 5 wherein two tabs are formed on said internal brake shoe backing plate, either tab aligned with said first spring intermediate section in reversed configurations of said disc brake.

7. The disc brake according to claim 1 wherein said second spring comprises a leaf spring having connecting sections extending laterally away from a central location on said external shoe backing plate, said sections disposed with the width extending axially to be axially rigid and further including terminal portions engaging said other stem axially to create said axial spring force.

* * * * *